United States Patent [19]
Roth

[11] Patent Number: 5,490,365
[45] Date of Patent: Feb. 13, 1996

[54] ANCHOR BOLT ASSEMBLY

[76] Inventor: Steven A. Roth, 2891 Danville Blvd., Alamo, Calif. 94507

[21] Appl. No.: 241,320

[22] Filed: May 11, 1994

[51] Int. Cl.$^6$ .................................................. E04B 1/38
[52] U.S. Cl. ........................ 52/704; 52/707; 405/259.5; 405/259.6; 411/82; 411/930
[58] Field of Search ..................... 52/704, 707; 411/82, 411/258, 930, 429, 430, 431, 903; 405/259.5, 259.6; 156/289, 293; 264/264, 318, 130, 242, 35

[56] References Cited

U.S. PATENT DOCUMENTS

| | | |
|---|---|---|
| 3,477,337 | 11/1969 | Racki ................................ 411/903 X |
| 3,687,493 | 8/1972 | Lock et al. . |
| 4,263,832 | 4/1981 | Lang et al. . |
| 4,270,331 | 6/1981 | Lang et al. . |
| 4,642,964 | 2/1987 | Kellison . |
| 4,652,193 | 3/1987 | Hibbs ........................................ 411/82 |
| 4,840,524 | 6/1989 | Bisping et al. ........................ 52/704 X |
| 5,170,606 | 12/1992 | Popp ..................................... 411/82 X |
| 5,193,958 | 3/1993 | Day ............................................ 411/82 |
| 5,263,804 | 11/1993 | Ernst et al. ......................... 411/258 X |

OTHER PUBLICATIONS

*Anchoring Systems for Construction*, Kelken–Gold catalog cover and p. 6.
Ramset/Redhead Concrete Anchor Systems catalog, copyright 1990, pp. 14 and 15.

*Primary Examiner*—Carl D. Friedman
*Assistant Examiner*—Christopher Todd Kent
*Attorney, Agent, or Firm*—Glen R. Grunewald

[57] ABSTRACT

An anchor assembly for use in adhesively bonding an anchor consisting of a threaded anchor member having an adhesive release coating its threaded portions and having a hollow end dimensioned to receive the threaded portion connected to the end of the threaded portion and extending from it to provide a space within the adhesive in which the threaded portion of the assembly can be contained.

4 Claims, 1 Drawing Sheet

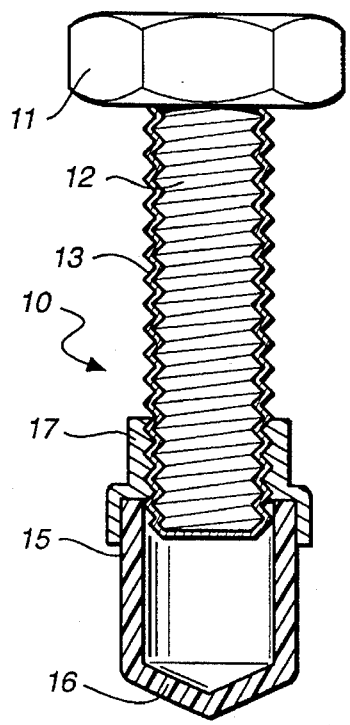
FIG._1
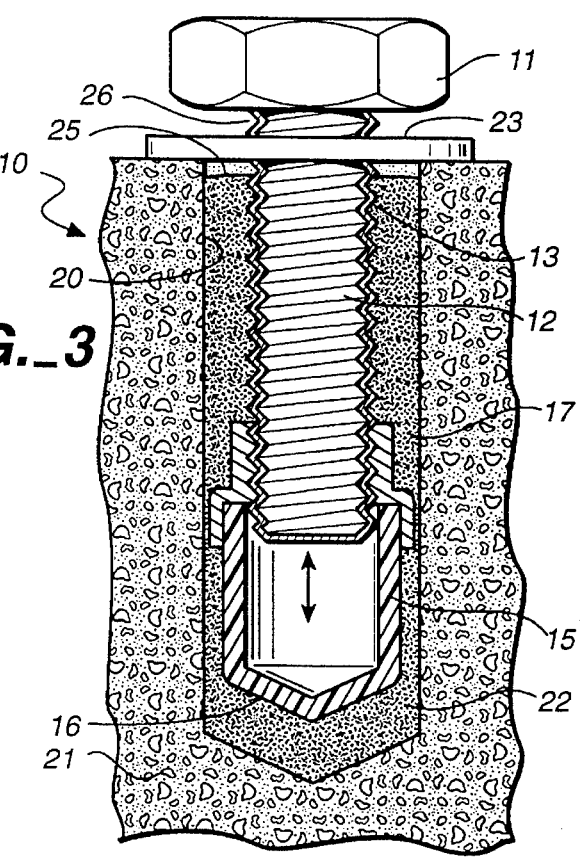
FIG._3
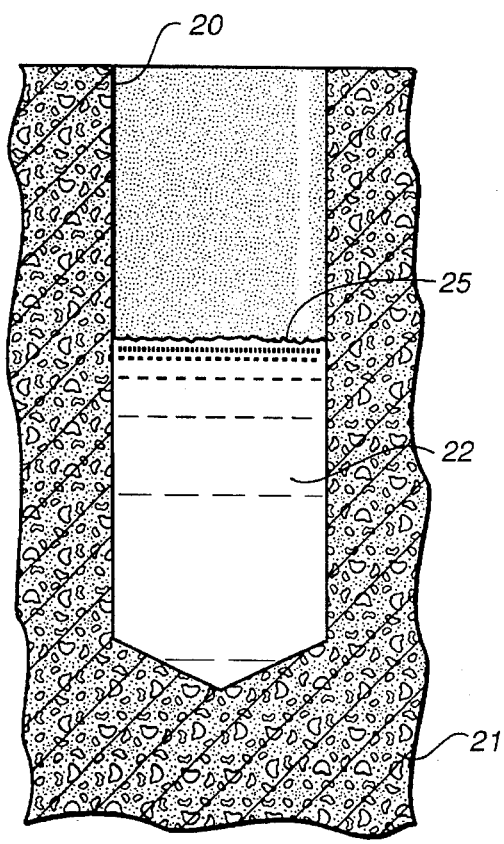
FIG._2
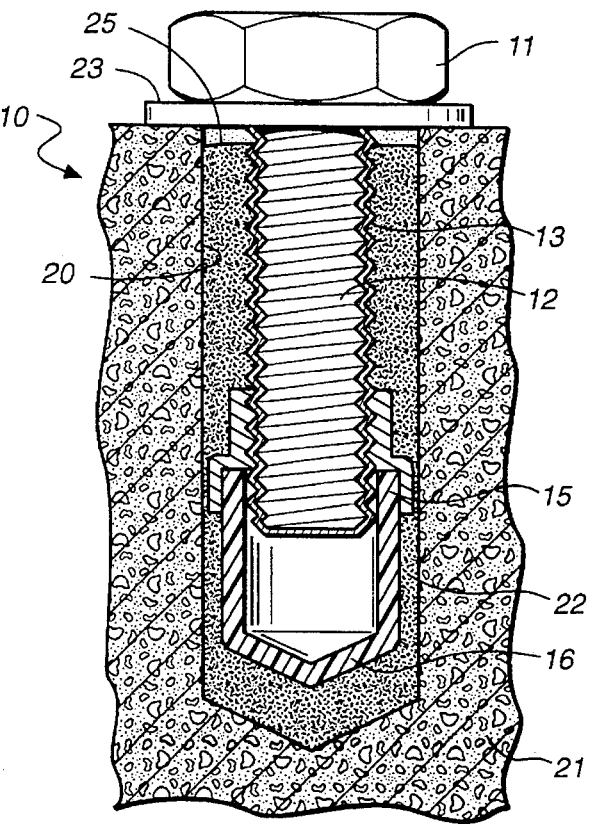
FIG._4

ANCHOR BOLT ASSEMBLY

TECHNICAL FIELD

This invention is in the field of providing anchors to hold fixtures to concrete.

BACKGROUND ART

It is frequently necessary to hold fixtures such as shelves, pipes, heating ducts, rows of seats, machinery and the like, which are hereinafter referred to as fixtures, to concrete, brick, stone, plaster, stucco, plasterboard or the like, which are hereafter referred to as concrete. Many anchor systems have been used for this purpose. The most primitive anchors are wooden plugs driven into holes drilled in concrete to anchor fixtures with ordinary wood screws. Other systems use deformable metal such as lead which can receive a screw and which can be deformed to provide a high-friction bond with a hole drilled into concrete.

More recently adhesive has been used to hold anchor members such as threaded studs in holes. Adhesive, which will hereinafter be called epoxy, is very effective because fixing a stud and attaching it to the fixture can be done in a single operation. For example, installing a row of stadium seats on a concrete platform can be accomplished by placing the seats where they are ultimately to be attached, drilling holes in the concrete through the holes in the feet of the seats that are provided for holding them and, after cleaning dust from the holes, partly filling the holes with epoxy and afterwards putting a seat-holding stud in each hole. When the epoxy sets it bonds the stud firmly to the concrete with a bond that is permanent, waterproof and usually stronger than the concrete to which it is bonded. However, studs anchored in that way cannot easily be removed. Accordingly, fixtures held with adhesive bonding as described above normally are held with threaded studs instead of bolts so that fixtures can be removed by removing a nut from the threaded portion of the stud that extends out of the hole in the concrete. Typical of such studs are those known as EPCON ANCHORS sold by ITW RAMSET/REDHEAD of Wood Dale, Ill.

More recently, studs set in concrete with epoxy have been first coated with a release for the epoxy—typically TEFLON tape wrapped around the threads that are set in an epoxy bond so that the set epoxy in the hole acts more as a nut than as a permanent bond. TEFLON is a trademark for polytetrafluoroethylene materials. In such uses a threaded stud can be screwed out of the epoxy because the release material prevents bonding of the epoxy to the metal. A problem with anchors of that nature is that, although the stud can be removed from the epoxy plug by screwing it out, it cannot be screwed any farther into the hole because epoxy surrounds the bottom of the stud as well as its sides. Thus, if it is desired to screw a bolt or a threaded stud farther into an epoxy-bonded anchor, it is necessary to remove that threaded member and to replace it with a shorter one that will not reach the bottom of the threaded epoxy cavity. This limitation has virtually mandated that anchors set in epoxy be threaded studs which permit tightening the connection to a fixture by tightening an external nut on that part of the stud that extends out of the hole in which it is bonded.

DISCLOSURE OF THE INVENTION

This invention greatly mitigates the problems with adhesively set anchors. The device of this invention is a threaded anchor assembly which may be a bolt held in a self-formed epoxy nut cast in a hole in concrete as in the prior art described hereinabove. After the epoxy sets, the threaded anchor assembly of this invention can be tightened to hold the fixture tightly in place.

The device of this invention is a threaded anchor member used in an adhesive anchoring system. The threaded anchor member is coated with a release for the adhesive, and it has a hollow end member large enough in diameter to contain the threaded anchor member, and it may be held to the end of that threaded anchor member with only enough integrity to prevent the epoxy from leaking into the hollow area. Because adhesives such as epoxy are usually very viscous there is no difficulty connecting the hollow end member adequately to resist leakage of the epoxy into the hollow end. The end member can be threaded throughout its length or it can be connected to the threaded anchor portion of the assembly with a snap-on arrangement or with a single turn of tape around the area where the hollow member connects to the anchor member.

The term hollow end member as used in this description and the following claims includes end members that are not literally hollow but are capable of becoming a hollow chamber in the set epoxy when force exerted by an anchor bolt is applied against them. An example of such a hollow end member is a very fragile closed-cell rigid foam plug attached to the end of an anchor bolt to avoid leakage of epoxy beneath the bolt during setting of surrounding epoxy. When the surrounding epoxy sets the anchor bolt can be screwed into the epoxy and the closed-cell foam plug will crumble to provide a space for the anchor bolt to enter the cavity in the epoxy created by the foam plug.

Although this invention has broad application, it will be illustrated by the procedure of installing a row of seats on a concrete platform in a stadium. The installation starts by placing the row of seats on its concrete platform in its desired ultimate position. Afterwards holes can be drilled in the concrete through the holes in the feet of the seats that are provided to receive anchors, and those holes can be cleaned—for example, with a blast of air—without moving the seats. The holes can then be filled with enough epoxy so that when the anchor bolts are inserted in the hole the epoxy rises to the top of the hole. Then the anchor bolt assemblies of this invention are inserted into the holes.

The bolts that are used are already coated with release and the hollow end members, which are already in place, can be inserted through the holes in the feet of the seats. The anchor assembly is surrounded with epoxy and it is left in the hole in the concrete until the epoxy sets, usually about twenty-four hours. If the seats are not anchored to the concrete platforms tightly enough after the epoxy sets, the bolts can be screwed deeper into the holes because the hollow end members provide a cavity for the ends of the bolts to enter as they are screwed in.

Using bolts to hold down seats or machinery or equipment is very advantageous compared to using studs because, if the fixtures held by the anchor bolts are to be removed, the bolts can be screwed out of the holes leaving only holes in the floors or walls where they were previously attached. The heads of the bolts provide easy means for manipulating them within the epoxy because an ordinary wrench can apply enough torque to remove the bolt from the threaded hole. The threaded holes may then be covered with flat-headed bolts, or the like, to avoid having the holes fill with dirt or dust. The use of bolts in the device of this invention is particularly advantageous because the bolts can be tightened as well as removed. Although the hollow end member may be very fragile, after the epoxy surrounding it sets the cavity it created beneath the threaded element is surrounded by the epoxy and it becomes a strong and permanent feature of the hole to which the anchor bolts are connected.

BRIEF DESCRIPTION OF THE DRAWINGS

FIG. 1 is an elevational cross-section of an anchor assembly embodying this invention.

FIG. 2 is a cross-section of a hole in concrete containing liquid epoxy and prepared to receive the anchor assembly of FIG. 1.

FIG. 3 illustrates the next step of the installation wherein the assembly of FIG. 1 is inserted in the receiving hole of FIG. 2.

FIG. 4 illustrates how the assembly illustrated in FIG. 3 can be tightened after it is installed and after the epoxy surrounding the assembly sets.

BEST MODE FOR CARRYING OUT THE INVENTION

Although this invention clearly has broader applications, FIGS. 1–4 will be described with reference to the use of the invention in anchoring a row of stadium seats to a concrete platform. This embodiment of the device of this invention is best seen in FIG. 1 which shows the device in general 10 comprised of a bolt-like element having a hex head 11 and a threaded shaft 12. The threaded shaft is coated with a release 13 which may be a TEFLON tape wrapped around the threads or a wax or plastic coating applied to the threads. The device also includes a hollow housing 15 which is provided in this embodiment with a pointed bottom 16. The hollow housing is connected to the bottom of the threaded shaft with tape 17 in a manner to seal the interior of housing 15 from the surrounding epoxy as will be discussed hereinbelow. Because epoxy and other suitable adhesives for fixing anchor bolts are normally very viscous and because the seal need persist only until the epoxy sets, a tight and permanent seal is not necessary. The seal may be provided with a snap-on cap 15, or it may be provided with a cap that is placed around the bottom of the threaded shaft 13 and wrapped with tape 17. The housing 15 may be a deep threaded cap having only a few threads connected to the threaded shaft 12 or an ordinary coupling with a sealed bottom. The only function of the seal is to prevent epoxy from entering the cavity before it sets.

FIG. 2 illustrates the first step in installing the anchor bolt assembly of this invention. A concrete platform is drilled with a hole 20 of appropriate size to receive the anchor bolt assembly of this invention, usually about ⅛ to ¼ inch larger in diameter than the diameter of the bolt. The hole is drilled with conventional equipment and cleaned with conventional equipment, such as a plastic-bristled brush and a blast of air. When the hole is drilled to a depth longer than the entire assembly of this invention it is filled with the appropriate amount of epoxy, shown as 22 in FIG. 2. The amount of epoxy is the amount necessary to virtually fill the annular space between the anchor bolt 12 and the wall of hole 20, as illustrated in FIG. 3. FIG. 3 shows the assembly 10 inserted in the hole 20 and it displaces the epoxy 22 so that the upper level 25 is approximately at the opening of the hole 20. Prior to placing the assembly 10 in hole 20 the foot of the stadium seat 23 is put in position and the assembly 20 is inserted through a hole in that foot provided to receive the anchor. When the device of this invention is in the position shown in FIG. 3 it may stand undisturbed until the epoxy 22 sets—normally a time period of not more than 24 hours, as is known to the art. When epoxy 22 sets it forms a self-nut with the threaded shaft 12 and it completely surrounds the entire threaded shaft as well as the hollow housing 15. Because of the release 13, the threaded shaft 12 can be screwed into and out of the epoxy surrounding the shaft and firmly bonded to the side of hole 20.

FIG. 3 illustrates a common problem in mounting fixtures to concrete, namely, that the mounting assembly is not tightly in contact with the fixture. Thus, a space 26 exists between hex head 11 and fixture 23 which causes an undesirable loose connection. The device of this invention permits hex head 11 to be rotated to screw the threaded shaft 12 deeper into hole 22. The interior of hollow housing 15 provides space for the shaft to enter hole 20 deeper and to make a tighter connection to fixture 23. When epoxy 22 has hardened and cured fully, even if housing 15 is fragile, its fragility is no longer a factor because it is supported by and bonded to the strong epoxy.

In the normal installation the fixture to be anchored is placed in the position where it is to be held, hole 20 is drilled through the hole provided in the fixture for anchoring, hole 20 is cleaned by normal means without removing the fixture, epoxy in the pre-selected quantity is introduced into the hole 20, the anchor assembly is passed through the holding hole in the fixture and into the epoxy-containing hole in the concrete—whereupon the level of epoxy rises to approximately the top of the hole. The epoxy then hardens to make a self-nut which bonds to the hole in the concrete but does not bond to the threaded shaft because of the release. The installation of the fixture is complete at that point. However, if it is necessary to tighten the anchor, that process can be accomplished with a wrench by simply applying torque to the hex head 11 to screw it deeper into hole 20 until the desired degree of tightness is obtained. It is not necessary to remove or replace the anchoring assembly to tighten the connection. It is evident that the device of this invention permits rapid installation of anchors which can be tightened or removed with very little time and with tools that are available to any tradesman.

The device of this invention can also anchor fixtures to vertical walls and even to ceilings using techniques known to the art. Very viscous adhesive can be inserted into screens which, in turn, can be inserted into horizontal holes or holes opening downwardly. Adhesive leaks through the screen to bond with the hole in the concrete but it does not flow out of the screen, because the slow flow rate caused by its viscosity leaves ample time to insert the threaded anchor shaft and its hollow end cap. Such techniques are known to the art.

What is claimed is:

1. An anchor assembly for an adhesive-set anchor to hold a fixture to a structure through a hole in a foot of said fixture, comprising an anchor member having a threaded shaft;

a hollow, cylindrical housing fixed to one end of said threaded shaft and extending a distance beyond said one end, said hollow housing having an inside diameter sufficient to contain said one end and an outside diameter adapted to be smaller than said hole in said foot;

a release for said adhesive, said release coating said threaded shaft.

2. The assembly of claim 1 wherein said adhesive is epoxy and said release is polytetrafluoroethylene tape.

3. The assembly of claim 1 wherein said adhesive is epoxy and said release is wax.

4. The assembly of claim 1 wherein said anchor member is a bolt.

* * * * *